Patented Mar. 15, 1949

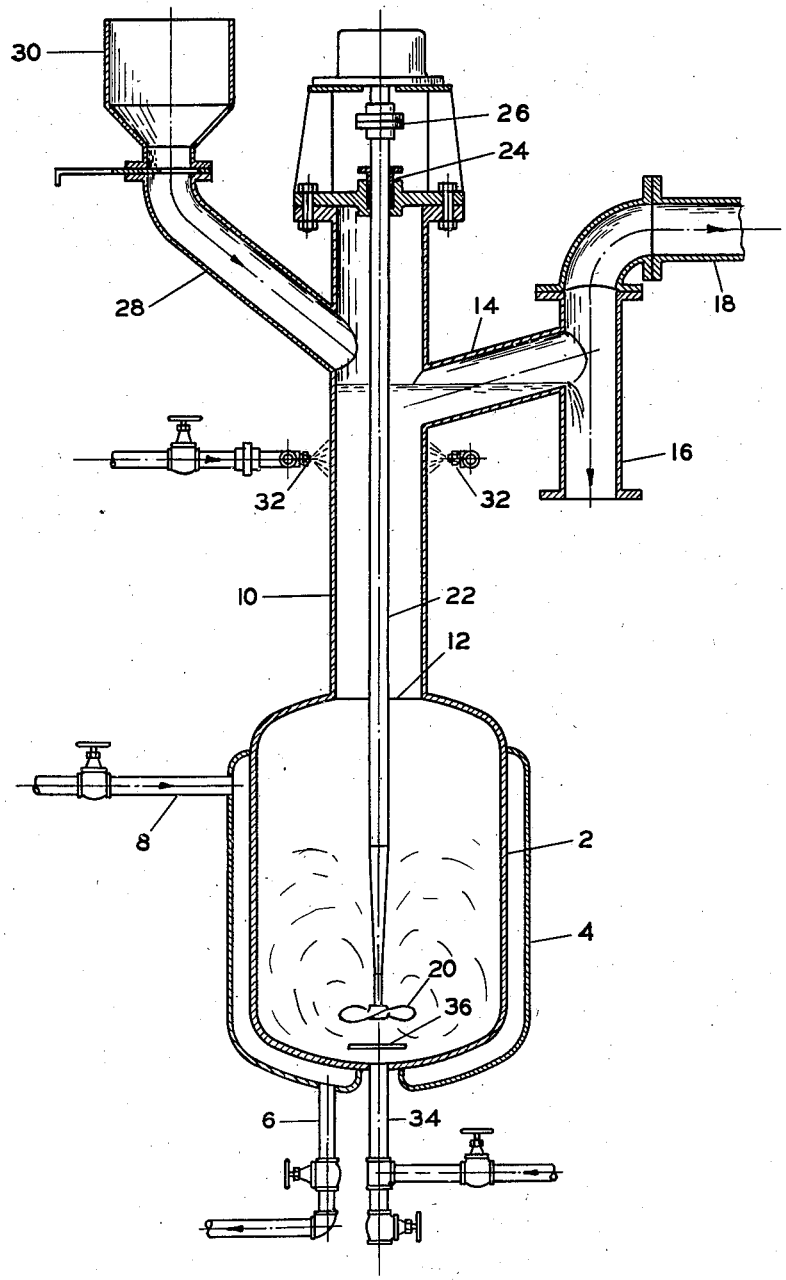

2,464,685

UNITED STATES PATENT OFFICE 2,464,685

CONTINUOUS GRIGNARD METHOD

Alfred Hirsch, Painesville, Ohio, assignor to Diamond Alkali Company, Cleveland, Ohio, a corporation of Delaware Application December 2, 1946, Serial No. 713,491

5 Claims. (Cl. 260—665)

This invention relates to a method of preparing metallo organic compounds and more particularly relates to a continuous process for preparation of organo magnesium halides, such as alkyl or aryl magnesium halides. The continuous method of this invention has particular application to the synthesis of organic compounds according to the method of Grignard.

In the Grignard synthesis an organo magnesium halide is prepared as an intermediate and is subsequently used in an anhydrous solvent for the synthesis of various classes of organic compounds, such as hydrocarbons, primary, secondary, and tertiary alcohols, aldehydes, ketones, carboxylic acids, and the like. In addition, the Grignard synthesis has been found to be a convenient method for obtaining intermediate in the synthesis of organic compounds of silicon exemplified by mono, di, tri, and tetra organic substituted silanes, and the like. Magnesium compounds suitable for the Grignard synthesis of any of the materials mentioned above and containing accordingly any aryl or alkyl radicals or various combinations of both types of radicals, magnesium, and a halide, such as chlorine, bromine, or iodine, are generally termed Grignard compounds. These Grignard compounds have the general formula R—Mg—X where R represents aryl, alkyl, or mixed hydrocarbon radicals, Mg is magnesium, and X represents halogen, and are prepared by reaction of an anhydrous solution of RX with Mg.

The Grignard synthesis and the preparation of Grignard compounds are usually conducted in the presence of an anhydrous solvent of which anhydrous ethyl ether is the best known and most readily available though other ethers, tertiary amines and the like, may be used. Conditions for conducting the synthesis on a batch basis and the various steps to be used therein are well-understood and have been thoroughly described in text books of organic chemistry and other chemical literature. Furthermore, efforts have been made to devise a method of producing Grignard compounds of the above general formula by a continuous operation and various disclosures may be found in the art of such continuous methods. In general, these continuous methods are directed to the provision of a stationary body of magnesium metal through which, either by gravity flow or by pumping, the ether solution of the organic halide is passed with the object of obtaining the addition reaction in the body of magnesium. These attempts have met with but little success and for various obvious reasons. One of the difficulties of producing a continuous Grignard reaction which the art has encountered is that magnesium metal, unless it is given a pretreatment, is substantially unreactive to RX compounds and accordingly, a difficulty is presented not only in starting up a new reaction but in continuing a reaction which has already started where addition of fresh magnesium is necessary.

A further and perhaps more significant difficulty of the prior art continuous Grignard methods arises from the use of stationary bodies or masses of magnesium metal. This method of operation results in substantially all cases in a deposition of magnesium chloride in the interstices of magnesium particles, the chloride being derived not only from the normal Grignard reaction but also from the reaction of already formed Grignard reagent with further RX which the newly formed reagent readily contacts at the zone of reaction particularly since removal of reagent from this zone cannot be efficient. This condition is aggravated as the reaction proceeds by the further clogging of the magnesium mass whereby products of reaction are maintained for a substantial time in the reaction zone. The yield of desired Grignard reagent is obviously reduced to the extent that such side reactions take place. The considerable excess of magnesium chloride formed from the secondary RX—Grignard reagent reaction coats the magnesium metal with magnesium chloride and thus deactivates it, contributing to the early blocking of the tube or stationary reactor with inactive material. When blocking takes place, the apparatus must be shut down, the stationary reactor cleaned and recharged with fresh magnesium and the magnesium newly pretreated.

Where the so-called continuous operation is conducted employing a column of magnesium, it has usually been found that reaction occurs substantially entirely in the zone of original contact of the RX solution with the metal, so that the remainder of metal in the column has at best only the function of supporting the thin layer of reacting material and does not enter into the reaction. Furthermore, the thin reactive layer of magnesium soon clogs as noted above and shutdown becomes necessary. Accordingly, it may be seen that the principal difficulty with prior art continuous Grignard reactions has been that at best they are merely semi-continuous and are often less attractive from a yield and cost standpoint than the well-known batch methods heretofore employed.

The present invention contemplates the provision of a continuous Grignard reaction wherein the entire body of magnesium metal, which is preferably in large excess to that theoretically required for the reaction, is maintained in continuous mechanical agitation at the zone of reaction and further contemplates the constant removal from the zone of reaction of the newly formed R—Mg—X compound whereby further reaction of Grignard compound with additional RX solution is minimized. It includes, in addition, provision for automatic preconditioning in situ of added fresh magnesium.

The method of the present invention avoids the difficulties noted in connection with the prior art in that the magnesium is enabled to enter the reaction in a more efficient manner as all of it is located at or near the point of introduction of the RX solution and can react immediately. This may be contrasted with a mere top or bottom reacting layer of a stationary column of magnesium as described in the prior art showings.

It is a particular feature of the method of the present invention that a large excess of magnesium is maintained at or near the point of introduction of the RX solution and sufficient agitation both from the reaction itself and, if necessary, from additional mechanical stirring is provided to remove the newly formed R—Mg—X away from contact with newly entering RX whereby the reaction between RX and Mg preferentially takes places and the yield of R—Mg—X is accordingly enhanced.

The agitation of the magnesium has the additional advantage of maintaining on the metal particles, at least partially by mechanical scrubbing, a bright metallic surface at all times, which bright surface is far more reactive to RX than surfaces clouded with magnesium chloride formation.

The invention may be better understood by reference to an apparatus in which it has been practiced and which has been found particularly useful for the running of continuous Grignard reactions in accordance with the present method. The single figure of the drawing is a vertical sectional view of this type of structure.

Referring to the drawing, a reaction chamber 2, which may suitably be provided with jacket 4 into which steam or cooling water may be introduced as desired by means of pipes 6 and 8, is provided with a relatively long neck 10 mounted in the top opening 12 of the vessel 2. The neck 10 has an arm 14 leading to an outlet 16 and preferably has an explosion safety release 18. The vessel 2 is provided with stirrer 20, which is mounted on shaft 22, the shaft 22 extending through the neck 10, stuffing box 24, and terminating in coupling 26 from which it may be driven by any convenient means, as a driving motor mounted thereabove. The neck 10 is also provided with passageway 28 leading from hopper 30 and is preferably cooled by water from pipes 32, which water plays directly against the outer surface of the neck 10. Pipe 34 leads directly into the bottom of vessel 2 and plate 36 serves to interrupt and distribute a stream of liquid entering through pipe 34. In general, it has been found preferable to practice the method with the apparatus substantially sealed from the atmosphere, as shown.

The apparatus is utilized in the following manner: Chamber 2 is charged initially with a suitable quantity of previously conditioned magnesium turnings, coarse powder, or the like. As noted below, a convenient method of preconditioning the magnesium is to treat it for a short time with previously prepared Grignard reagent-ether solution. RX solution in ether is introduced into the vessel 2 through the pipe 34 and stirrer 20 is turned on. The stirrer 20 is operated at sufficient speed to keep the magnesium turnings in vessel 2 in a constant state of motion and it is aided in this respect by the relative violence of ebullition caused by the reaction between the entering RX and the magnesium in the bottom of vessel 2. In some instances it has been found that this boiling motion is sufficient to render the use of mechanical stirring unnecessary but, in general, it is preferred to supplement the agitation caused by the reaction with mechanical agitation in order to insure that no caking or solidification of the magnesium-magnesium chloride mixture can occur and that an excess of Mg over newly formed R—Mg—X is present at and below plate 36. The cooling water from pipes 32 being turned on, the level of ether solution of R—Mg—X formed by the reaction in vessel 2 rises into the neck 10 and ultimately into the arm 14 from whence it overflows into the outlet 16 and may be collected for further treatment.

It is apparent that eventually the original charge of preconditioned magnesium material will become exhausted and provision is made therefore for the addition of further magnesium while the reaction continues. This magnesium, however, need not, as will appear below, be preconditioned externally of the reaction apparatus. The additional magnesium is charged into hopper 30 and as needed is released through the tube 28 into the neck 10. Preferably sufficient magnesium is initially charged into the vessel 2 so that the level of Grignard compound—ether solution will be in the arm 14 before additional magnesium is required and accordingly, newly added magnesium will fall by gravity through the ether solution of Grignard compound contained in the neck 10 on its way to the reaction vessel proper. It is well-known that one of the most convenient ways to precondition magnesium metal for use in the Grignard reaction is to treat the same with already prepared Grignard reagent and it will be observed that this invention is designed to precondition the magnesium continuously by permitting it to contact Grignard reagent previously formed in the reaction.

The neck 10 has an additional function of temperature adjustment for the reaction and serves the highly desirable purpose of eliminating the necessity for a reflux condenser which is commonly employed in Grignard reactions. By adjustment of the temperature and force of the streams of water from pipes 32, the temperature of the solution in neck 10 may be modified and will in turn adjust the temperature in reactor 2 and thus the relative violence of the reaction.

It will be appreciated that the present apparatus is only an exemplary embodiment of the method of this invention and that the method can conveniently be applied to various other apparatus or may moreover, if desired, be suitably operated particularly in the laboratory more or less by hand. The method of the invention, however, which includes the features of continuous agitation of the magnesium and preconditioning of new magnesium in Grignard compound already formed in the reaction, is understood to be applicable to any desired form of reaction apparatus.

For further and better understanding of the present method, the following examples of its practice as applied to particular materials are offered, it being understood that many variations in materials used and practices followed may be employed without deviation from the invention herein.

1. Using a reaction apparatus such as is shown in the drawing, the vessel 2 is charged with about 350 grams of magnesium turnings. As an aid to preconditioning this originally charged material, 20 ml. of .4 molar benzyl Grignard compound, and 5 ml. of ethyl bromide are also charged to the vessel 2. 500 ml. of benzyl chloride dissolved in 2500 ml. of ethyl ether is introduced into the bottom of the reactor with agitation by means of a stirrer or the like at all times over a period of 4½ hours. Cooling water, both about the reaction vessel and the extended neck thereof, is used as necessary for control of boiling. The reaction proceeds very smoothly and results in a continuous conversion of the order of 87%. Magnesium is added from time to time, benzyl chloride in ether solution is added continuously, and the product is continuously drawn off from the overflow in high yields.

2. Using an apparatus like that shown in the drawing and following the same conditions set forth in Example 1, phenyl magnesium bromide is prepared. A solution having a concentration of 500 ml. of phenyl bromide in 1000 ml. of ether is passed into a reaction chamber containing about 350 gms. of magnesium turnings suitably agitated. The phenyl magnesium bromide is easily obtained in a yield of 95% and above for as long as the reaction is run with suitable quantities of fresh magnesium being supplied thereto from time to time, phenyl bromide solution being added continuously and phenyl magnesium bromide solution being continuously withdrawn from the overflow.

3. Similarly, ethyl magnesium chloride may be prepared. 1 mol of ethyl chloride is dissolved in 500 ml. of ethyl ether. This solution is continuously introduced into a reaction apparatus such as that described herein containing about 350 gms. of previously conditioned magnesium turnings. More magnesium is added as needed and additional ethyl chloride solution is continuously introduced. Ethyl magnesium chloride solution is withdrawn from the overflow, a conversion factor of the order of 90% being continuously obtained.

It will be apparent from the foregoing that by means of continuous agitation of the body of magnesium metal together with provision for introduction of further magnesium metal and for its preconditioning, a continuous Grignard reaction method has been devised which solves the problems heretofore encountered and unsolved in efforts to devise continuous Grignard reactions. It is apparent that no caking or clogging can occur in the body of magnesium as long as agitation continues since no fusion of the particles in the flask is ever permitted to be initiated. The formation of R—Mg—X is substantially quantitative as by removing the newly formed Grignard reagent from the zone of entry of RX and providing an excess of magnesium at that point, side reactions are effectively avoided. It will further be observed that the present method is subject to very sensitive temperature control which may be accomplished by the adjustment of cooling of the column 10 and by adjustment of the rate of introduction of ether RX solution, the reaction with magnesium producing more than sufficient heat to run the reaction at a reasonable rate.

As pointed out above, the reaction is applicable to all of the well-known heretofore suggested applications of the Grignard reaction. Any suitable form of magnesium metal, such as turnings, pellets, or coarse powder, may suitably be used in practicing the method of the invention and any convenient anhydrous solvent adapted to act also as a solvent for the Grignard compound may suitably be employed in the place of ethyl ether.

While there has been described various embodiments of the invention, the methods and apparatus described are not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. The continuous process for effecting a reaction between Mg and RX to obtain R—Mg—X where R is chosen from the group consisting of alkyl, aryl and mixed alkyl aryl radicals, Mg is magnesium, and X is halogen, which includes the steps of maintaining a body of Mg metal particles in continuous agitation, continuously supplying RX in ether solution to said body of Mg at the bottom thereof to form R—Mg—X in ether solution, maintaining a body of said R—Mg—X solution above said body of Mg and in contact therewith, withdrawing product from said body of R—Mg—X solution, and feeding fresh Mg to said agitated Mg through said body of R—Mg—X solution.

2. The method of claim 1 which includes the steps of adjusting the speed of the reaction and the violence of the agitation by adjustment of the speed of introduction of RX solution.

3. The continuous process for effecting a reaction between Mg and RX to obtain R—Mg—X, where R is chosen from the group consisting of alkyl, aryl and mixed alkyl aryl radical, Mg is magnesium, and X is halogen, which includes the steps of maintaining a body of magnesium metal particles in continuous agitation, continuously supplying RX in ether solution into initial and direct contact with said body of magnesium thereby to form R—Mg—X in ether solution, maintaining a body of said R—Mg—X solution above said body of Mg and in contact therewith, cooling said body of R—Mg—X solution by external application of cooling fluid, and continuously withdrawing a portion of said body of R—Mg—X solution and feeding fresh Mg to said agitated Mg through said body of solution.

4. The process which includes the steps of continuously agitating a mass of magnesium metal particles, continuously introducing a solution, in an anhydrous Grignard reagent-compatible carrier, of RX where R is chosen from the group consisting of alkyl, aryl and mixed alkyl aryl radicals and X is halogen, and into direct contact with said mass of agitated magnesium metal, thereby to form R—Mg—X in solution, continuously maintaining a body of R—Mg—X solution above and in contact with said agitated mass, continuously withdrawing said R—Mg—X solution from the top of said body and adding fresh Mg to said agitated mass through said body.

5. The continuous process for effecting a reaction between magnesium and RX to obtain R—Mg—X, where R is chosen from the group consisting of alkyl, aryl and mixed alkyl aryl radicals, Mg is magnesium, and X is halogen, which includes the steps of maintaining a body of Mg particles in continuous agitation, continuously introducing RX in ether solution into direct contact with said body of Mg at the base of said body, thereby to form R—Mg—X in ether solution, immediately upwardly displacing newly formed R—Mg—X in ether solution from the zone of introduction of said RX solution, maintaining a body of said displaced R—Mg—X solution above said agitated Mg and in contact therewith, continuously withdrawing a portion of said displaced R—Mg—X solution from the top of said body of R—Mg—X solution by overflow, and intermittently introducing fresh magnesium into the reaction zone from the top of and through said body of R—Mg—X solution.

ALFRED HIRSCH.

REFERENCES CITED

The following references are of record in the file of this patent:

UNITED STATES PATENTS

| Number | Name | Date |
| --- | --- | --- |
| 2,066,198 | Buc | Dec. 29, 1936 |
| 2,395,777 | Brunjes et al. | Feb. 26, 1946 |
| 2,404,599 | Sanderson | July 23, 1946 |
| 2,414,505 | Artuzen | Jan. 21, 1947 |

Certificate of Correction

Patent No. 2,464,685.　　　　　　　　　　　　　　　　　　　　March 15, 1949.

ALFRED HIRSCH

It is hereby certified that error appears in the printed specification of the above numbered patent requiring correction as follows:

Column 1, line 17, for the word "intermediate" read *intermediates*;

and that the said Letters Patent should be read with this correction therein that the same may conform to the record of the case in the Patent Office.

Signed and sealed this 23rd day of August, A. D. 1949.

[SEAL]

THOMAS F. MURPHY,
*Assistant Commissioner of Patents.*